April 20, 1954   P. VOGELSANG   2,675,942
SEED PLANTER HAVING MAGNETIC SEED SELECTING MEANS
Filed Aug. 28, 1948   5 Sheets-Sheet 1

April 20, 1954   P. VOGELSANG   2,675,942
SEED PLANTER HAVING MAGNETIC SEED SELECTING MEANS
Filed Aug. 28, 1948   5 Sheets-Sheet 2

Inventor
PHELPS VOGELSANG
Attorney

April 20, 1954   P. VOGELSANG   2,675,942
SEED PLANTER HAVING MAGNETIC SEED SELECTING MEANS
Filed Aug. 28, 1948   5 Sheets-Sheet 3 fig. 5 fig. 16 fig. 12

Inventor
PHELPS VOGELSANG
Attorney

April 20, 1954     P. VOGELSANG     2,675,942
SEED PLANTER HAVING MAGNETIC SEED SELECTING MEANS
Filed Aug. 28, 1948     5 Sheets-Sheet 4

Inventor
PHELPS VOGELSANG
Attorney

Patented Apr. 20, 1954

2,675,942

UNITED STATES PATENT OFFICE 2,675,942

SEED PLANTER HAVING MAGNETIC SEED SELECTING MEANS

Phelps Vogelsang, Midland, Mich., assignor to Processed Seeds Inc., Midland, Mich., a corporation of Michigan Application August 28, 1948, Serial No. 46,673

9 Claims. (Cl. 222—9)

This invention relates to seed planters and more particularly to a seed planter designed to utilize magnetic means for selecting seeds coated with a paramagnetic material and to deposit each of them a constant, predetermined distance apart in a prepared seed bed.

Heretofore many means for planting seeds at a predetermined spacing have been used but each of them has failed to provide a satisfactory spacing especially when use of the higher speeds available in modern tractors and farm machinery is attempted. These previously existing means have included mechanical fingers designed to grip each individual seed, means employing a vacuum to hold the seed and specially shaped and sized pockets to transport the seed. Some of these methods are capable of a fair degree of accuracy but only at slow speeds. In addition, the more accurate of the previously existing devices are complicated and expensive and all are difficult designs in which to modify the spacing.

The real economy to be obtained from mechanical planting is the quick even spacing of the individual seeds. Unless this is accomplished thinning and partial reseeding is necessary, involving such expense in hand labor and reworking as to often nullify the economy of the mechanical seeding operation. This particular problem of subsequent reseeding and thinning has, until my invention, greatly retarded the growing of important crops such as onions, tomatoes and sugar beets. It is also frequently important that an entire crop be planted within the shortest possible period of time. This can be done only by two means, increasing the speed of existing planting facilities or increasing the quantity of facilities available. The use of increased speed is by far the most economical but heretofore it has been impractical due to the disproportionate increase in the percentage of inaccurate seeding.

A further disadvantage of many of the existing planter designs is that they are so large as to necessitate a separate supporting carriage. They are not suitable for attachment to and support by a tractor or powered garden cultivator. In the case of planters employing a vacuum, additional complicated equipment in the form of a vacuum and pressure pump is required. All of this is eliminated by my invention since it is small enough to be easily attached to the standard tractor, standard type drill or cultivator chassis or small garden cultivation equipment and requires no special operating machinery.

An additional improvement in my planter is that its design permits the actual planting operation to be observed at all times since the rotor releases the seeds at a substantial distance above the ground and no guide tube or other enclosure is used between this point of release and the ground. This arrangement enables the operator to constantly check on the planter to see whether or not it is actually planting as desired. Existing designs enclose this operation, preventing such observation.

The use of a magnetic seed planter is particularly desirable when the seeds have been pelleted. The use of magnets greatly reduces abrasion and the paramagnetic coating for the seed can be incorporated with the materials making up a portion of the shell of the pellet. The added cost of pelleted seeds can be largely overcome by the elimination of waste in planting.

By using a planter employing a number of magnets on a rotating wheel I have eliminated these difficulties since my planter always picks up a seed, even at high speeds, and assures that only one seed will be selected and dropped at each planting space. Furthermore, it always drops the seed at the same spacing and cannot skip several spaces then deposit a number of seeds in one space. Although my planter is capable of accuracy at high speeds, this has not been accomplished at the sacrifice of accuracy in the lower speed ranges. The construction of my planter assures maintenance of precise spacing at both high and low speeds giving the machine capacity for a wide range of operating conditions.

It is, therefore, a primary object of my invention to provide a seed planter capable of maintaining a high degree of accuracy whether operated at high, low or intermediate speeds.

It is a further object of my invention to provide a seed planter in which the spacing may be changed by a few quick and simple operations.

It is an additional object of my invention to provide a seed planter adapted to select and plant seeds within a wide range of sizes without necessitating modification of the seed selector.

It is a further additional object of my invention to provide a seed planter which is simple in construction, easy to maintain and economical to manufacture.

Other objects and purposes of my invention will be apparent to those acquainted with the design and construction of agricultural equipment upon reading the following specification and the accompanying drawings.

In designing a seed planter capable of executing the objects and purposes of my invention I have provided a seed box operatively communicating with a disk-shaped rotor having spaced magnetic inserts. The magnets, as they pass through the seed container each select a seed and remove it from the container. The seed is carried by the rotor until dropped into the seed bed. The rotor is caused to rotate oppositely to the direction of travel of the planter and at the same rate of speed, permitting the seeds to drop therefrom without either forward or backward momentum.

Figures 1, 2, 6, 9:
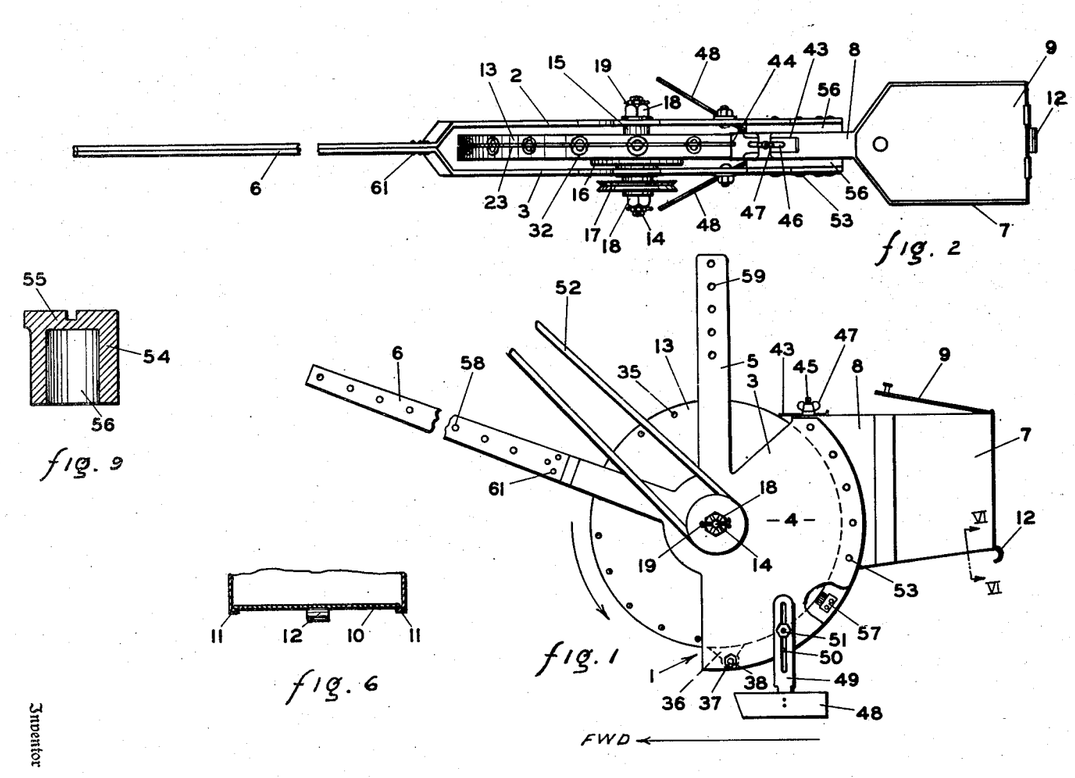
Figure 1 is a side elevational view of my seed planter.
Figure 2 is a top view of my seed planter.
Figure 6 is a fragmentary sectional view of the bottom of my seed container taken along the plane VI—VI of Figure 1.
Figure 9 is an enlarged sectional view of the plug for my invention.

In the following description the terms "up" and "down" are freely used and are to be taken as down towards the seed bed and up away therefrom when the planter is in its normal position as shown in Figure 1. The terms "forwardly" and "rearwardly" are also freely used and are to be taken as forward in the direction of travel of the planter when in use as indicated by the arrow in Figure 1 and rearward away therefrom. The terms "inwardly" and "outwardly" are likewise freely used with respect to the rotor and are to be taken to mean inwardly toward the axis of the rotor and outwardly towards the rotor's periphery.

Referring now to the drawings in detail, the numeral 1 indicates a housing consisting of two side members 2 and 3. Each of the side members consists of a cover portion 4, a vertical arm 5 and an inclined arm 6. The inclined arms 6 of each of the side members 2 and 3 are offset towards each other to form a single rigid supporting arm extending forwardly of the housing. A number of attachment holes 58 and 59 are provided in the inclined arms 6 and the vertical arm 5 respectively (Figure 1) to permit adjustment of the planter unit to the points of attachment available on various types of equipment. Each of the side members 2 and 3 may be formed from a single sheet of material by some suitable method such as stamping or each may be an assembly of several parts joined by riveting or welding.

The rearward end of the housing 1 is open and receives between the side members 2 and 3 a bulk seed container 7. The forward end of the seed container 7 is narrowed to form a funnel 8 suitable for seating within the open rearward end of the housing. The width of the funnel 8 is such that it is no wider than the hereinafter described rotor 13. The top of the seed container is equipped with a lid 9 which may be opened to put seed into the container. The bottom of the seed container consists of a sliding panel 10 supported by flanges 11 and provided with a handle 12 (Figures 1 and 6). The panel 10 slopes downwardly in a forward direction, the purpose of which will appear more fully hereinafter.

Figure 3:
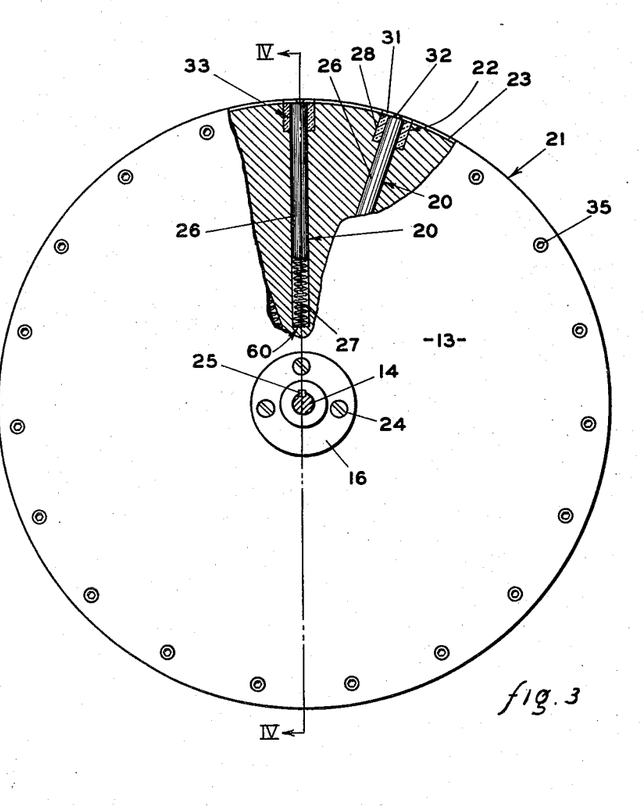
Figure 3 is a side elevational view of the rotor of my seed planter.
Figure 4:
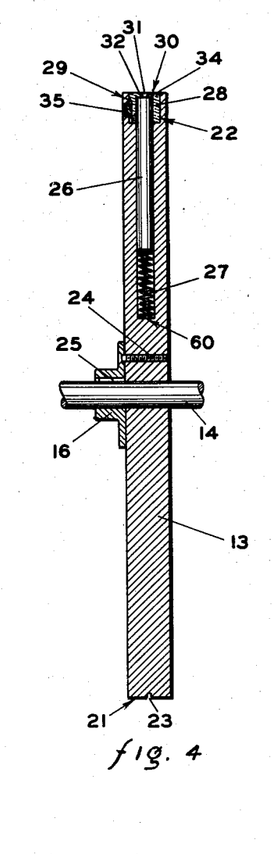
Figure 4 is an elevational sectional view of the rotor of my invention taken along the plane IV—IV of Figure 3.
Figure 5:
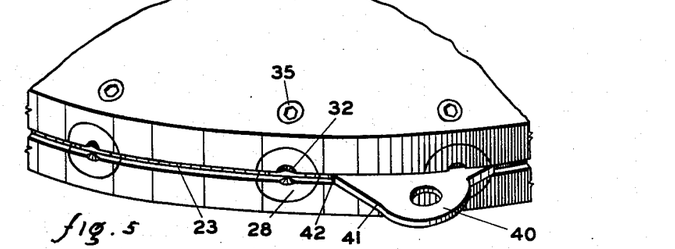
Figure 5 is a fragmentary oblique view of the rotor and seed ejector of my seed planter.

Substantially at the geometrical center of the housing 1 a rotor 13 is mounted between the side members 2 and 3 on the shaft 14 and spaced from the side 2 by means of the spacer 15 and from the side 3 by means of the boss member 16. A pulley 17 suitable for engaging a V-shaped belt or chain is mounted by means of a key on one end of the shaft exterior of the housing 1. The shaft is held in place by means of a nut 18 and cotter pin 19 on each end. The rotor 13 is disk-shaped and contains a plurality of radially extending, blind, cylindrical bores 20 (Figures 3 and 4). These bores 20 extend radially inwardly from the periphery 21 of the rotor to a point substantially more than one-half the radius of the rotor and are positioned midway between the sides of the rotor. The open end of the bores 20 is counterbored at 22 (Figures 3 and 4) to provide an enlarged opening. At the periphery of the rotor 13 and spaced midway between its sides is a groove 23 extending around its entire circumference.

The boss member 16 is attached to one side of the rotor by means of the screws 24 and to the shaft 14 by means of a key 25 to insure rotation of the rotor with the shaft.

Figures 7, 8, 10, 14:
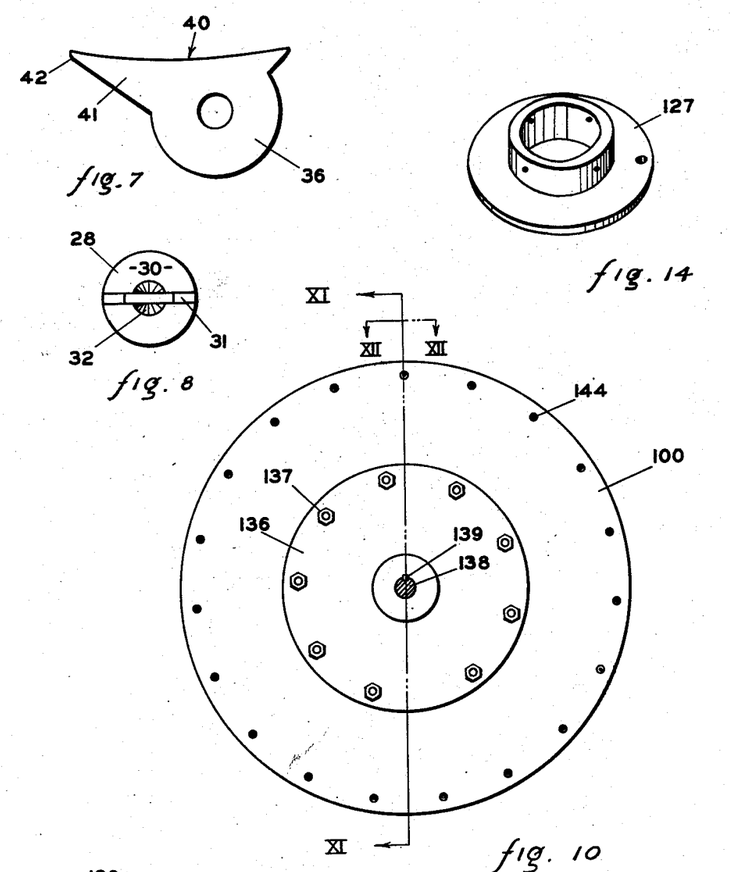
Figure 7 is an enlarged side elevational view of the seed ejector for my invention.
Figure 8 is an enlarged end view of a retainer for the magnet of my invention.
Figure 10 is a side elevational view of a modification of the rotor of my invention adapted for utilizing a temporarily energized magnet.
Figure 14 is an enlarged oblique view of the support for the circuit control element of my modified rotor.

Within each of the bores 20 is a rod shaped permanent magnet 26 (Figure 4) seated at its radially inner end upon a spring 27. The spring 27 extends between the end of the magnet 26 and the blind end 59 of the bore 20. A retainer 28 seats within the counterbore 22 and substantially closes the open end of the bore 20. The retainer 28 is cylindrical in shape except for a flat seat 29 parallel to its axis on one side of the cylinder. The seat 29 does not extend to the outer face 30 of the retainer 28 (Figures 4 and 8) in order that the retainer, when seated within the counterbore 22, will, except for the concentric opening and a portion of the slot 31 therein, entirely close the end of the bore 20 and prevent the entrance of dirt. A slot 31, similar in every respect to the groove 23 extends across the outer face 30 of the retainer 28 parallel to the seat 29. A frustro-conical shaped depression 32 is located at the center of the retainer 28 and is of such size that at the bottom of the slot 31 the diameter of the depression corresponds to the width of the slot 31. A central opening 33 similar in diameter to the bore 20 extends from the inner face of the retainer 28 outwardly to the bottom of the slot 31 creating a shoulder 34 (Figure 4). The retainer 28 is held in place by the set screw 35 which bears against the seat 29. An ejector 36 (Figures 1 and 7) is located at the bottom of the rotor 13 and is mounted to the housing by the stud 37 and associated nuts 38. The ejector 36 is spaced from each of the side members 2 and 3 by spacers and is so mounted that it is free to rotate about the stud 37. It is equipped with an arcuate face 40 concavely curved on the same radius as the bottom of the groove 23 of the rotor 13 (Figure 7). The forwardly extending lip 41 of the ejector 36 is provided with a rounded but substantially blunt leading edge 42. The width of the ejector 36 is such that it will seat within the groove 23 and will not bind as it slides along the groove when the rotor 13 is turned.

The magnets 26 are spaced around the periphery of the rotor at any suitable distance depending in part upon the desired minimum spacing of the seeds and the space available in a rotor of a particular diameter. This minimum peripherial spacing may be 1½, 2 or 3 inches or more or any variation of this as circumstances may require.

The magnet 26 is made from a material suitable for permanent magnetization such as iron. The rotor 13, retainer 28, and ejector 36 are made from any suitable non-magnetic material such as aluminum, brass or magnesium. The seed container 7, lid 9, and sliding panel 10 may be made from a non-magnetic material such as aluminum, brass, magnesium or plastic but the material need not necessarily be limited to those having non-magnetic characteristics.

Mounted to the top of the seed container 7 adjacent the rotor is a scraper 43 of non-magnetic material having an aperture 44 at one end corresponding in both width and depth to the dimensions of the groove 23. An upwardly extending threaded member 45 rigidly attached to the seed container 7 passes through the elongated opening 46 in the scraper 43. A wing nut 47, mounted on the threaded member 45, tightens against the scraper 43 to hold it in position.

A pair of furrow covering blades 48 are attached to the housing 1 by means of the mounts 49, pins 50 and stud and nut assemblies 51. The blades 48 are set at an angle to the direction of travel of the planter such that they will urge the earth into the furrow after the seeds have been deposited. A furrow opener is used to make the furrow but since it need not be attached to the planter and forms no part of this invention it is not shown or described. The blades 48, like the furrow opener, are not an essential part of my invention and may be eliminated without affecting the functional principle of my device.

The rotor 13 is rotated by means of a belt 52 or a chain engaging the pulley 17. The belt 52 may be driven by a separate motor or a power takeoff from the tractor which propels the planter. It may also be driven by suitably connecting it to the supporting wheels of the propelling vehicle. The source of power is not shown as it may be any one of the presently used arrangements and forms no part of this invention. The only limitation on the power source is that it be coordinated in speed to the rate of movement of the planter along the ground. As my invention is herein described, it is also necessary that it drive the rotor in a direction opposite that of the movement of the planter along the ground. The direction of rotation is indicated by the curved arrow in Figure 1. This is not an absolute essential but it is a very preferable arrangement. The purpose of this last limitation will appear more fully in the description of the operation of my invention. Between the ejector 36 and the point where the rotor 13 enters the seed container 7 it is desirable to mount a brush 57 (Figure 1) to clean dust and magnetized foreign particles from the rotor once during each rotation.

Assembly

A spring 27 and magnet 26 are inserted in each of the bores 20 of the rotor 13 and forced down into place by installation of the retainer 28. The slot 31 is aligned with the groove 23 and the retainer is locked into place by tightening the set screw 35. The boss member 16 is fastened to the rotor by means of the screws 24. The shaft 14 is then inserted through the rotor 13 and spacer 15 with the key 25 in place. The side members 2 and 3 of the housing 1 are then put into place and the pulley 17 installed on the shaft 14. The nuts 18 are tightened and locked against further movement by the cutter pins 19.

After installation of the rotor assembly the seed container 7 is attached to the housing by means of bolts 53. The spaces between the inside surface of the sides 2 and 3 and the funnel 8 of the seed container 7 are closed by shims 56 (Figure 2) held in place by the bolts 53. The scraper 43 is locked into position with the aperture 44 in alignment with the groove 23. When properly positioned, the end of the scraper 43 provides merely a running clearance between it and the periphery 21 of the rotor. The sliding panel 10, in fully inserted position, provides a similar clearance with the periphery 21 of the rotor. This clearance must be such that no seeds may pass between the sliding panel 10 and the rotor. In the case of both the scraper 43 and the sliding panel 10 it is essential that this clearance be held to a minimum to prevent the passage of seeds.

The ejector 36 is seated with its arcuate face 40 within the groove 23. The spacers are placed on each side of the ejector and the stud 37 inserted through both the spacers and ejector 36. The nuts 38 are tightened on each end of the stud to complete the installation of the ejector. The ejector 36 is so positioned that the lip 41 extends forwardly into the direction of rotation of the rotor 13 and its leading edge 42 is slightly forward of a vertical plane passing through the center of the shaft 14. The cover blades 48 are installed on each side of the housing 1 by seating the mount 49 for each cover blade over a pin 50 and stud 51 and tightening the nuts.

The brush 57 is installed within the housing in firm contact with the periphery 21 of the rotor. Bolts 61 adjacent the offset in the inclined arms 6 clamp the arms together into a single rigid member, completing the assembly of the planter.

The planter is mounted to a carrying vehicle such as a tractor by attaching the ends of the vertical arms 5 and the inclined arm 6 to suitable points at the rear of the tractor, in a position such that the rotor 13 is spaced upwardly from the earth a substantial distance. The planter is thus entirely supported by the carrying vehicle. The size and simplicity of this planter enables it to be attached to small agricultural equipment such as a two wheel garden tractor or cultivator. The belt 52 is connected to a power source and with this operation the planter is ready for use. If desirable, it is also possible to mount the planter upon its own carriage and merely tow it by means of the propelling vehicle.

Operation

To operate my planter the seed container 7 is filled with seeds or seed pellets coated with a paramagnetic material through the opening normally covered by the lid 9. The forwardly sloping sliding panel 10 urges the seeds toward the rotor 13 and insures continuous planting of the seeds until the entire supply is exhausted. By making the panel 10 removable, surplus seeds may be easily and quickly removed by withdrawing the panel and dropping the seeds into a container placed immediately below. As the rotor 13 is turned by the belt 52 in a direction such that it passes upwardly in the area exposed to the funnel 8, each of the magnets 26 attracts and retains a seed in the associated depression 32. If more than one seed is retained by the magnet, these excess seeds are removed by the scraper 43 and drop back into the funnel 8. The magnets 26 are only exposed to the seeds at the base of the depression 32 thus this will be the only area in which the rotor will attract and hold a seed. The use of non-magnetic materials for the remaining parts of the rotor 13 assures limitation of the magnetic fields to the magnet areas. The frusto-conical shape of the depression 32 centers the seed assuring its passage through the scraper 43 and its removal by the ejector 36.

The rotor 13, after picking up each seed, carries it over the top of the rotor and down the forward side until the ejector 36 is reached. The leading edge 42 of the ejector 36 contacts the seed and dislodges it from the magnet so that it drops freely into the furrow. The use of the ejector not only provides a simple method by which the seed may be dislodged from the magnet but insures the dropping of each seed at exactly the same point on the rotor. By rotating the rotor in a direction opposite to the direction of travel of the planter the seed is dropped with zero momentum, permitting it to fall in a straight line into the furrow. This assures accurate spacing of the seeds even when the planter is moved forwardly at relatively high speeds. There is no tendency of the seeds to curve forwardly during their fall thereby eliminating the tendency of the seeds to bunch due to differently curved paths of fall. Since the combination of the scraper 43 and frusto-conical shaped depressions 32 permit only one seed to be carried by each magnet, bunching of seeds in the furrow due to the deposit of several seeds at a time is eliminated.

The upward rotation of the rotor 13 in the area exposed to the seeds in the funnel 8 greatly lessens damage due to abrasion since the seeds are urged upwardly where they are free to move away from the rotor rather than downwardly where they are compressed tightly against each other. The seeds, after deposit in the furrow, are covered with earth by the cover blades 48 which urge the earth back into the furrow.

The speed of the rotor is at all times regulated by the speed of forward motion of the planter. The movement of the periphery of the rotor is equal to the lineal forward motion of the planter. Thus, a two inch spacing between the magnets 26 at the periphery of the rotor 13 will cause the seeds to be deposited at a two inch spacing in the furrow. This relationship, however, may be varied by changing the diameter of the pulley 17 thus effecting a larger or smaller spacing in the furrow. By this is meant that a specific movement of the rotor could be coupled with a greater relative movement of the ground to provide a spacing equal to the length of ground covered. This procedure may be reversed to produce a spacing in the furrow less than the distance between the magnets on the rotor.

The spacing of the seeds may be varied in multiples of the peripheral spacing of the magnets 26 by inactivating certain of the magnets. This is accomplished by removing the retainer 28 and substituting a plug 54. The plug 54 is similar to the retainer 28 except that it has no cone shaped recessed face and the opening 56 (Figure 9) does not penetrate as deeply as the counter-bore leaving a wall of metal 55 of substantial thickness between the end of the magnet 26 and the bottom of the slot 31. The slot 31 must be provided in the plug aligned with the groove 23 to permit operation of the ejector 36. The plug is held in place by the set screw 35. As many plugs are used as magnets it is desired to inactivate.

Modification

A modification of my invention using magnets which are only periodically energized, is shown in Figures 10 through 16. In the modified form the housing 1 remains the same except that the spacing between the side members 2 and 3 is increased to accommodate the wider rotor.

Figures 12, 16:
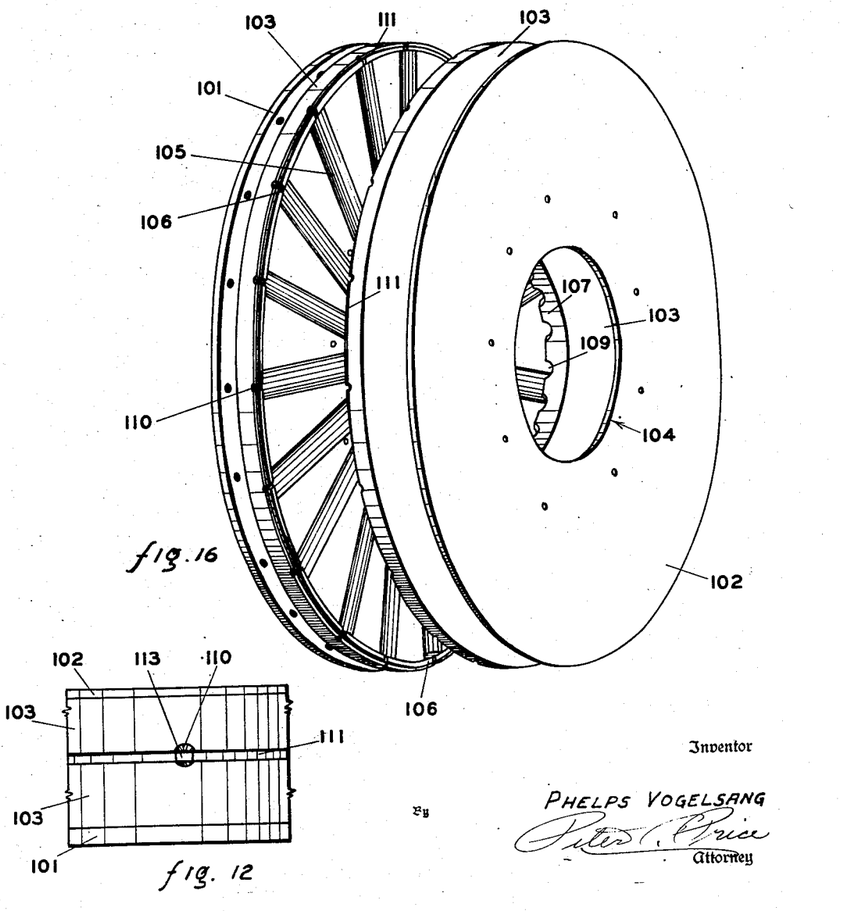
Figure 12 is a fragmentary top view of the modified rotor taken along the plane XII—XII of Figure 10.
Figure 16 is an enlarged exploded view of my modified rotor with the magnets removed.

The modified rotor 100 consists of a thick disk 101 and a thin disk 102 separated by a pair of identical center units 103 (Figures 10 and 16). The thin disk 102 has a large central opening 104 to permit it to fit over the electrical equipment associated with the housing and surrounding the mounting shaft. The disks 101 and 102 are both made from a suitable electrically conductive non-magnetic material such as brass, aluminum or magnesium. The thin disk 102 need not be made from an electrically conductive material but must have sufficient strength to partially support the rotor. The center units 103 are each substantially disk-shaped having a diameter equal to that of the disks 101 and 102 but having a central opening equal in size to the opening 104 in the thin disk 102. The center units 103 are formed from an electrically non-conductive material such as hard rubber or a plastic. Each center unit 103 has a number of radially extending, semi-circular pockets 105 (Figure 16) formed therein. The number of these pockets 105 is determined by the number of magnets with which the rotor 100 is to be equipped and this in turn is determined partially by the diameter of the rotor and partially by the minimum peripheral spacing desired. Each of the pockets 105 are partially enclosed on their outer end by a wall 106 and on their inner end by a wall 107. When the center units 103 are placed together the pockets 105 in each of the units align to form a cylindrical compartment 108 partially closed on each of its ends by the walls 106 and 107. A circular opening 109 concentric with the compartment 108 extends through the wall 107 on the inner end and an opening 110 extends through the wall 106 on the outer end. The opening 110 is frustro-conical in shape having its smallest diameter at the point of tangency with the compartment 108. A groove 111 equi-distant between the disks 101 and 102 extends around the periphery of the rotor and is formed in the center units 103. The groove 111 is similar in every respect to the groove 23 in the rotor 13. The openings 109 and 110 and the groove 111 are each formed in halves, each half appearing in one of the center units 103.

Figure 11:
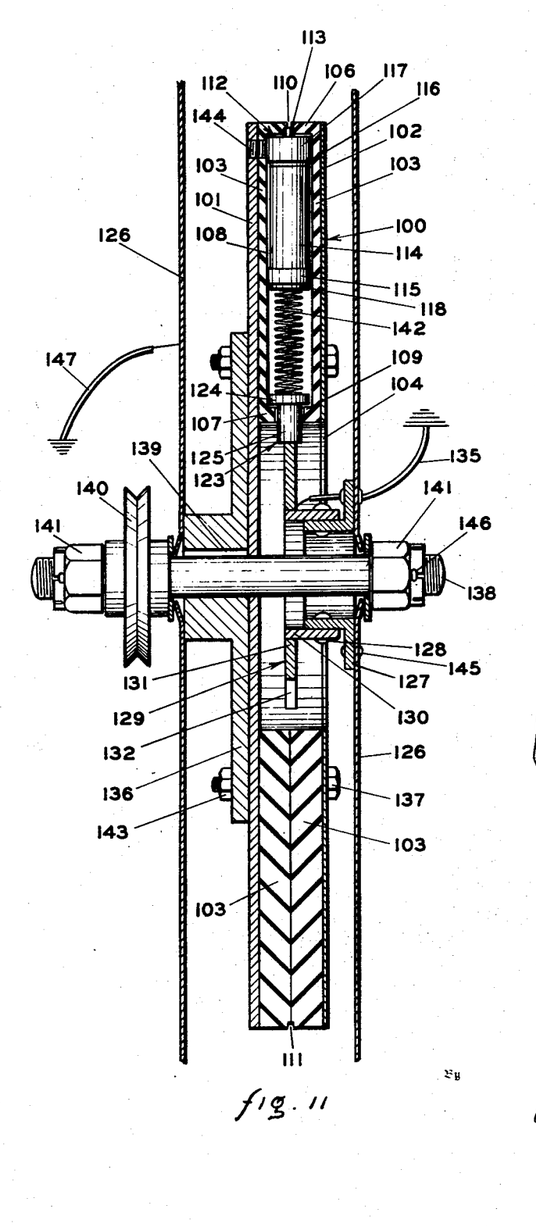
Figure 11 is a sectional view of the modified rotor taken along the plane XI—XI of Figure 10 and fragmentally shows the assembled position of the rotor.
Figure 13:
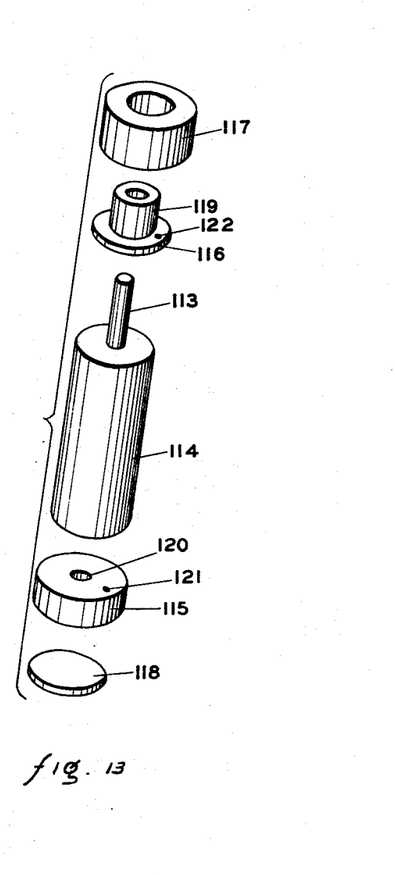
Figure 13 is an exploded detail view of the magnet for my modified rotor.
Figure 15:
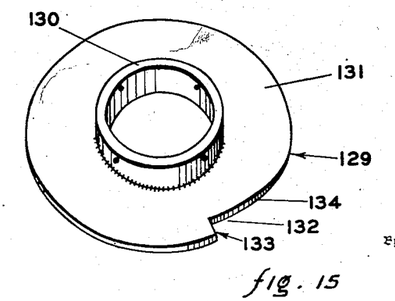
Figure 15 is an enlarged oblique view of the circuit control element of my modified rotor.

Within each of the compartments 108 is a magnet 112. Each of the magnets 112 consists basically of a core 113 of material suitable for temporary magnetization and a winding 114 of insulated wire (Figures 11 and 13). At the inner end of the winding is an insulating washer 115. An electrically conductive ring 117 is placed adjacent the outer insulating washer 116. A circular, electrically conductive plate 118 is placed adjacent the inner insulating washer 115. Both the ring 117 and the plate 118 are of substantially the same diameter as the compartment 108 and both are separated from the winding 114 by their respective adjacent insulating washers. The core 113 passes through and projects a short distance beyond both the ring 117 and the outer insulating washer 115. The ring 117 is suitably insulated from the core 113 as by a non-conductive insert 119 integral with the washer 116 immediately surrounding the core 113. The inner insulating washer 115 contains a circular pocket 120 into which the end of the core 113 seats. One end of the winding 114 passes through the hole 121 in the inner insulating washer 115 and is soldered or otherwise suitably attached to the plate 118. The other end of the winding passes through the hole 122 in the outer insulating washer 116 and is similarly attached to the ring 117. The insulating washers 115 and 116, the ring 117, plate 118 and the winding 114 of the magnet are all held together and to the core 113 as a unit by a suitable cement to provide an integrated assembly which may be installed or removed as a unit.

At the inner end of the compartment 108 a contact member 123 is provided consisting of a base 124 and a boss 125. The base 124 is seated within the compartment 108 with the boss 125 projecting inwardly through the opening 109. Inward movement of the contact member 123 is limited by interference between the base 124 and the inner wall 107.

To the non-rotatable housing 126 adjacent the thin disk 102 is mounted a collar 127 of electrical non-conductive material (Figure 14). To that portion of the collar 127 projecting at a right angle to the housing 126 there is attached, by suitable means such as rivets 128, a circuit control element 129 having an annular flange 130 and a disk flange 131 both formed from an electrically conductive material. A notch 132 having one defining wall 133 (Figure 15) substantially perpendicular to the periphery of the disk flange and a second defining wall 134 inclined at an angle to the periphery thereof. The size, purpose and position of the notch 132 will be described more fully hereinafter. The circuit control element 129 is connected to a source of electrical energy by the wire 135.

The rotor 100 is supported by the wheel 136 (Figures 10 and 11) to which it is attached by bolts 137 passing through the disks 101 and 102 and the center units 103, each located at a point substantially radially outward from the center of the rotor and between the compartments 108. The wheel is mounted upon a shaft 138 freely rotatable with respect to the housing 126 and the shaft and wheel are held against rotation relative to each other by the key 139. The shaft 138 is equipped with a pulley 140 and retaining nuts 141 similar, respectively, to the pulley 17 and nuts 18.

*Assembly of modified rotor*

One of the assembled magnets 112 is placed in each pocket 105 of one of the center units 103 with the projecting end of the magnet core 112 directed toward the outer wall 106. A contact member 123 is seated against the inner wall 107 of each pocket 105. A coil spring 142 of electrically conductive material is then compressed into place between the magnet 112 and the contact member 123 with one end in contact with the plate 118 and the other with the base 124 of the contact member 123. The other center unit 103 is then fitted against the first center unit and the magnets 112 and associated parts are thereby enclosed in the resulting compartments 108. The disks 101 and 102 are then placed one on each side of the assembled center units 103. The assembly bolts 137 are then passed through the aligned holes therefor extending through the wheel 136, disks 101 and 102 and the center units 103 and thereafter held in place by the nuts 143.

A set screw 144, threaded through a suitable opening in the disk 101, is tightened against the ring 117 of each of the magnets 112. The set screw 144 serves to both anchor the magnet and to provide a positive electrical connection between the ring 117 and the disk 101.

The circuit control element 129, previously assembled to the collar 127 by the rivets 128, is mounted on the housing by suitable attaching means such as rivets 145. The circuit control element 129 is so orientated at the time of assembly that the defining wall 133 of the notch 132 is positioned slightly forward of a plane perpendicular to the surface supporting the planter and passing through the center of the shaft 138 when the planter assembly is in operating position. It is sufficiently forward of this plane that the contact member 123 will be permitted to drop freely into the notch 132 slightly before reaching the plane passing through the center of the shaft 138. As so assembled, the defining wall 134 will extend rearwardly of the wall 133. The shaft 138 with the assembled pulley 140 will then be inserted through the housing 126 and the rotor 100 and thereafter held in place by the nuts 143 and associated cotter pins 146. The housing 126 is connected by a suitable bond 147 to a source of electrical energy. The modified rotor 100 is caused to rotate in the same direction as the rotor 13 and in the same manner.

*Operation of the modified rotor*

The modified rotor 100 operates in the same manner as the rotor 13 utilizing permanent magnets except that the magnets 112 generate magnetic force only when energized. To effect energization, the electrical current for each magnet 112 passes through a circuit including the wire 135, circuit control element 129, a contact member 123, a spring 142, a plate 118, a winding 114, a ring 117, a set screw 144, the disk 101, shaft 138 and bond 147. As the rotor 100 rotates with the shaft 138 the contact member 123 of each magnet 112 is urged against the circuit control element 129 by the spring 142, the diameter of the circuit control element 129 being such that the contact member 123 is forced outwardly a short distance into the compartment 108. This arrangement assures a tight electrical connection. When the contact element 123 is moved by the rotor 100 into the area of the notch 132 it loses contact with the circuit control element 129 and the electrical circiut is broken, inactivating that particular magnet 112. The circuit is again completed when the contact element 123 is rotated to a point in contact with the inclined defining wall 134 of the notch 132. In this manner the magnets 112 are alternately activated and inactivated. With the notch 132 positioned as heretofore described, each magnet 112 is energized as it enters the seed container 7 and remains energized until it is almost directly below the shaft 138 where the opening of the circuit causes the seed held by the magnet to be dropped. The length of the notch is such that the magnet is inoperative between the point where seed is dropped and where that same magnet enters the seed container 7. This interval of inoperativeness may be shortened, however, it must be a sufficient interval of inoperativeness as will positively permit the seed to drop from the rotor and not be deflected in its path of fall by a reimposed magnetic field. An ejector 36 may or may not be used at this point. It is not essential as in the case of the permanent magnet. If the ejector is not used, the groove 23 may be eliminated since it will then serve no purpose.

When it is desired to render one or more of the magnets inoperative, this may be simply accomplished by removing the set screw 144 associated with each of the particular magnets to be immobilized. By removal of the set screw, the electrical circuit for that particular magnet is broken. The magnet 112 will be held in radial position without the set screw 144 by the spring 142 and is at all times held against lateral movement by the ring 117 and the inner insulating member 115.

Various other modifications in the construction and design of the specific apparatus as herein described and illustrated will immediately suggest themselves to those skilled in the art but it is to be understood that the invention is to be limited only by the spirit and scope of the appended claims.

I claim:

1. In means for individually depositing seeds having paramagnetic characteristics at predetermined equally spaced intervals, including a seed planter and means for moving said seed planter, the improvement in said seed planter comprising: a seed container; a plurality of individual magnets; means partially within said seed container for supporting said magnets in equally spaced association with each other and successively in operative association with said seed container; a source of motion for moving said magnets relative to said seed container whereby each of said magnets selects and removes one seed from said container; means for individually disassociating said seeds from each of said magnets.

2. In means for individually depositing seeds at predetermined, equally spaced intervals, including a seed planter, means for attaching said seed planter to a vehicle and a source of rotary motion for said planter, the improvement in said seed planter comprising: a seed container; a rotor positioned partially within said seed container; a plurality of circumferentially equally spaced magnets mounted on said rotor; means for rotating said rotor whereby each of said magnets selects and removes one seed from said container upon passing therethrough; means for individually disassociating said seeds from each of said magnets.

3. In means for individually depositing seeds at predetermined equally spaced intervals, the improvement in said means comprising: a seed container; a rotor positioned partially within said seed container; a plurality of circumferentially equally spaced magnets mounted within said rotor; a groove extending around the periphery of said rotor and a plurality of depressions having a common centerline with said groove and each co-axially aligned with one of said magnets; means for rotating said rotor whereby each of said magnets selects and removes from said container one seed upon passing through said container; means seated within said groove and adapted to slide therein relative to said rotor for individually disassociating said seeds from said magnets.

4. In means for individually depositing seeds at predetermined equally spaced intervals, the improvement in said means comprising: a seed container; a rotor positioned partially within said seed container; a plurality of circumferentially equally spaced magnets mounted within said rotor; a groove extending around the periphery of said rotor and a plurality of depressions having a common centerline with said groove and each co-axially aligned with one of said magnets; means for rotating said rotor whereby each of said magnets selects and removes from said container one seed upon passing through said container; means for removing and returning to said seed container by gravity all seeds selected by each magnet in excess of one; means seated within said groove and adapted to slide therein relative to said rotor for individually disassociating said seeds from said magnets.

5. In means for individually depositing seeds having paramagnetic characteristics at predetermined equally spaced intervals, including a seed planter and means for moving said seed planter, the improvement in said seed planter comprising: a housing; a seed container having a forwardly inclined bottom; a disc-shaped rotor extending partially into said seed container and having a plurality of circumferentially equally spaced radially extending internal compartments open at their outer ends; a peripheral groove in said rotor midway between the sides thereof; a magnetized bar positioned in each of said internal compartments; a non-magnetic plug diametrically grooved and having a concentric frusto-conical depression in its outer end for closing the open end of each of said internal compartments, the groove of said plug aligned with the peripheral groove in said rotor; a resilient member in each of said compartments urging the magnetized bar therein outwardly against said plug; a rotatable shaft supporting said rotor in non-rotatable relationship thereto; a power receiving means on one end of said shaft; an ejector adapted for slidably riding within said peripheral groove in non-rotatable relationship to said rotor and positioned adjacent a plane perpendicular to the surface upon which said planter is supported and including the axis of said shaft; a source of rotary motion adapted for rotating said rotor such that its lower periphery is moving in a direction opposite the direction of movement of said planter whereby each of said magnetized bars upon passing upwardly through said seed container will select and remove therefrom one seed and transport said seed until said seed is disassociated therefrom by said ejector; means for removing and returning by gravity to said seed container all seeds selected by each magnetized bar in excess of one.

6. In means for individually depositing seeds having paramagnetic characteristics at predetermined equally spaced intervals, including a seed planter and means for moving said seed planter, the improvement in said seed planter comprising: a seed container; a rotor having a plurality of circumferentially equally spaced and radially extending temporarily energizable magnets therein, a portion of said rotor extending into said seed container; a shaft supporting said rotor and a means for receiving rotary motion associated with said shaft; a source of electrical power connected to a plurality of electrical circuits each circuit including one of said magnets; means for alternately opening and closing each of said circuits individually as said rotor is rotated by said shaft, whereby each of said magnets upon passing through said seed container will select and remove therefrom one seed and thereafter release said seed upon opening of the circuit including that particular magnet.

7. In means for individually depositing seeds having paramagnetic characteristics at predetermined equally spaced intervals, including a seed planter and means for moving said seed planter, the improvement in said seed planter comprising: a seed container; a rotor having a plurality of circumferentially equally spaced and radially extending compartments therein each having a restrictive wall at each of their inner and outer ends; a temporarily energizable magnet including a winding in each of said compartments; a contact member slidably passing through the wall at the inner end of said compartment; a resilient member in each of said compartments for urging said magnets outwardly against the wall at the outer end of said compartment and said contact member inwardly through the wall at the inner end of said compartment; a shoulder on said contact member for limiting movement of said contact member inwardly; a rotatable shaft supporting said rotor; a collar having one portion of substantially reduced radius surrounding said shaft in non-contacting relationship thereto and contacting each of said contact members except in the area of reduced radius; means connecting one end of said magnet winding to said resilient member and further means connecting the other end of said winding to structure electrically bonded to said shaft; a source of electrical energy connected to said collar and to said shaft and a plurality of circuits each including one of said magnets electrically connecting said shaft and said collar, each of said circuits being closed when said contact member of said circuit contacts said collar and open when said contact member of said circuit does not contact said collar; each of said circuits being alternately and individually opened and closed as said rotor is rotated about said collar, whereby each of said magnets upon passing into said seed container will be energized and will select and remove therefrom one seed and thereafter release said seed upon opening of the circuit including that particular magnet.

8. In means for individually depositing seeds having paramagnetic characteristics at predetermined equally spaced intervals, including a seed planter and means for moving said seed planter, the improvement in said seed planter comprising: a housing; a seed container having a forwardly inclined bottom; a disc-shaped rotor extending partially into said seed container and having a plurality of circumferentially, equally spaced, radially extending internal compartments open at their outer ends; a peripheral groove in said rotor midway between the sides thereof; a magnetic member positioned in each of said internal compartments; a non-magnetic plug diametrically grooved and having a concentric frusto-conical depression in its outer end for closing the open end of each of said internal compartments, the groove of said plug aligned with the peripheral groove in said rotor; a resilient member in each of said compartments urging said magnetic member therein outwardly against said plug; a rotatable shaft supporting said rotor in nonrotatable relationship thereto; a power receiving means on one end of said shaft; an ejector adapted for slidably riding within said peripheral groove in nonrotatable relationship to said rotor and positioned adjacent a plane perpendicular to the surface upon which said planter is supported and including the axis of said shaft; a source of rotary motion adapted for rotating said rotor such that its lower periphery is moving in a direction opposite from the direction of movement of said planter whereby each of said magnetic members upon passing upwardly through said seed container will select and remove therefrom one seed and transport said seed until said seed is disassociated therefrom at said ejector; means for removing and returning by gravity to said seed container all seeds in excess of one selected by each magnetic member.

9. In means for individually depositing seeds having paramagnetic characteristics at predetermined equally spaced intervals, including a seed planter and means for moving said seed planter over a seed bed in one direction, the improvement in said seed planter comprising: a housing; a seed container having a forwardly inclined bottom; a disc-shaped rotor extending partially into said seed container, the plane of said rotor parallel to direction of movement of said seed planter; said rotor having a plurality of circumferentially, equally spaced radially extending internal compartments open at their outer ends; a peripheral groove in said rotor midway between the sides thereof; a magnetic member positioned in each of said internal compartments; a nonmagnetic plug diametrically grooved and having a concentric frusto-conical depression in its outer end for closing the open end of each of said internal compartments, the groove of said plug aligned with the peripheral groove in said rotor; a resilient member in each of said compartments for urging said magnetic member therein outwardly against said plug; a rotatable shaft spaced from said seed container in the direction of movement of said seed planter for supporting said rotor in nonrotatable relationship thereto; a power receiving means on one end of said shaft; an ejector adapted for slidably riding within said peripheral groove in nonrotatable relationship to said rotor and positioned adjacent a plane perpendicular to the surface upon which said planter is supported and including the axis of said shaft; a source of rotary motion adapted for rotating said rotor such that its periphery adjacent said seed bed is moving in a direction opposite from the direction of movement of said planter over said seed bed and said rotor's periphery within said seed container is moving upwardly whereby each of said magnetic members upon passing upwardly through said seed container will select and remove therefrom one seed and transport said seed until said seed is disassociated therefrom at said ejector; means for removing and returning by gravity to said seed container all seeds in excess of one selected by each magnetic member.

References Cited in the file of this patent

UNITED STATES PATENTS

| Number | Name | Date |
|---|---|---|
| 157,342 | Miller | Dec. 1, 1874 |
| 1,053,209 | Neumann | Feb. 18, 1913 |
| 1,105,293 | Mathorst | July 28, 1914 |
| 2,031,713 | Johnson | Feb. 25, 1936 |
| 2,235,922 | Friesenhahn | Mar. 25, 1941 |
| 2,440,846 | Cannon | May 4, 1948 |
| 2,514,890 | McLemore | July 11, 1950 |

FOREIGN PATENTS

| Number | Country | Date |
|---|---|---|
| 207,886 | Great Britain | Dec. 7, 1923 |
| 279,089 | Germany | Oct. 9, 1914 |